L. W. Fifield,
Needle.

N° 56,544.        Patented Jul 24. 1866.

Witnesses:
F. P. Hale Jr.
G. H. Washburn

Inventor:
Levi W. Fifield
by his attorney
R. H. Eddy

UNITED STATES PATENT OFFICE.

LEVI W. FIFIELD, OF HOLDERNESS, NEW HAMPSHIRE.

IMPROVEMENT IN KNITTING-MACHINE NEEDLES.

Specification forming part of Letters Patent No. 56,544, dated July 24, 1866; antedated July 13, 1866.

*To all whom it may concern:*

Be it known that I, LEVI W. FIFIELD, of Holderness, of the county of Grafton and State of New Hampshire, have made a new and useful invention having reference to the needles of knitting or hosiery looms or machines; and I do hereby declare the same to be fully described in the following specification, and represented in the accompanying drawings, of which—

Figure 1:
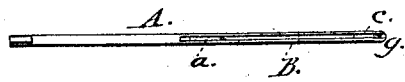
Figure 2:
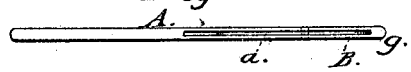
Figure 3:
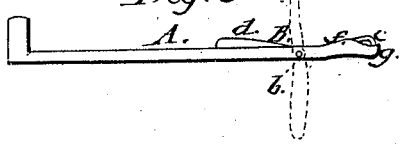
Figure 4:
Figure 5:
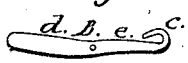

Figure 1 is a top view, Fig. 2 a bottom view, Fig. 3 a side elevation, and Fig. 4 a longitudinal section, of one of my improved needles. Fig. 5 is a side view of the hooked lever of the needle.

This needle is constructed of a hooked lever, B, and a slotted shank, A, the lever being arranged within the slot $a$ of the shank, and so as to turn on a pin, $b$, or rivet going through the lever and shank laterally.

The shank is constructed with a portion, $g$, to project beyond the hook $c$ of the lever, and to constitute a rest or support for the hook when in its lowest position. The lever is also formed with two cams or swells, $d\ e$, arranged on its arms in manner as represented. The shank has a swell, $f$, arranged so as to rise above the point of the hook and guide the loop over it when the hook is down upon the part $g$.

While the work is being forced back on the shank it will depress the tail of the lever so as to raise the hook out of the slot in a manner to enable the yarn to be laid in the hook. During an advance of the work, it, by acting on the part $e$, will depress the hook and pass over it and the yarn, and off the needle, so as to form a new loop.

Hooked needles as heretofore made for knitting-machines have had the hook on the shank, it being provided with a closer, working in a slot or groove of the shank; but with my invention the hook is affixed to a lever connected with and working in the shank, as specified.

The advantages of my needle are, that it can be made at less expense than most other kinds of needles. The hook of it is operated by the yarn, and thus I am enabled to dispense with the latch openers and pressers, thereby effecting an important saving in the construction of the loom. Besides this, the improved needle is more durable than the latch-needle.

I claim—

The needle as made of the slotted shank A and the hooked lever B, constructed, arranged, and applied together substantially in manner and so as to operate as described.

LEVI W. FIFIELD.

Witnesses:
W. S. GREENE,
J. L. SHIPLEY.